(12) United States Patent
Sun et al.

(10) Patent No.: US 9,510,358 B2
(45) Date of Patent: Nov. 29, 2016

(54) DEVICE AND METHOD FOR ACKNOWLEDGED MODE QOS

(75) Inventors: Ying Sun, Sundyberg (SE); Hongwei Wang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/408,472

(22) PCT Filed: Jun. 25, 2012

(86) PCT No.: PCT/SE2012/050705
§ 371 (c)(1),
(2), (4) Date: Dec. 16, 2014

(87) PCT Pub. No.: WO2014/003610
PCT Pub. Date: Jan. 3, 2014

(65) Prior Publication Data
US 2015/0282198 A1    Oct. 1, 2015

(51) Int. Cl.
*H04W 72/10* (2009.01)
*H04W 72/12* (2009.01)
(Continued)

(52) U.S. Cl.
CPC ............ *H04W 72/10* (2013.01); *H04L 1/0033* (2013.01); *H04L 1/1854* (2013.01); *H04L 47/14* (2013.01); *H04W 28/0205* (2013.01); *H04W 72/1247* (2013.01)

(58) Field of Classification Search
CPC ........... H04W 72/10; H04W 28/0205; H04W 72/1247; H04L 47/14; H04L 1/0033; H04L 1/1854
USPC .......................... 370/229, 336, 450, 329, 235
See application file for complete search history.

(56) References Cited

U.S. PATENT DOCUMENTS

| | | | |
|---|---|---|---|
| 8,654,642 B2 * | 2/2014 | Nakagawa | H04W 72/1247 370/235 |
| 2002/0080719 A1 | 6/2002 | Parkvall et al. | |

(Continued)

FOREIGN PATENT DOCUMENTS

| | | |
|---|---|---|
| EP | 1 089 500 | 4/2001 |
| EP | 1 513 300 | 3/2005 |
| EP | 2 134 133 | 12/2009 |
| WO | WO 03/096617 | 11/2003 |
| WO | WO 2013/186594 | 12/2013 |

OTHER PUBLICATIONS

Extended European Search Report issued by the EPO for Application No./Patent No. 12879815.4-1851 / 2865230 PCT/SE2012050705, May 22, 2015.
(Continued)

*Primary Examiner* — Kwang B Yao
*Assistant Examiner* — Syed M Bokhari
(74) *Attorney, Agent, or Firm* — Patent Portfolio Builders, PLLC (57) ABSTRACT

A method (200) for a controlling node of a cell (110) in a cellular system, the method comprising (205) the use of Radio Link Control Acknowledged Mode, RLC AM, and scheduling (210) transmissions in the downlink and uplink directions to/from User Equipments, UEs (115, 120, 125), in the cell (110). The scheduling comprises taking into account a priority which each UE has for its transmissions, and counting (215) the number of scheduled transmissions for a UE in a first of said directions since its latest scheduled transmission in the other of said directions. If (220) the count has reached a predetermined value, the priority of the UE in the other of said directions is increased (225), and when (230) the UE has been scheduled for a transmission in said other direction, the counting in said first direction is restarted (235) from an initial value.

8 Claims, 6 Drawing Sheets

(51) Int. Cl.
*H04L 1/18* (2006.01)
*H04L 1/00* (2006.01)
*H04L 12/801* (2013.01)
*H04W 28/02* (2009.01)

(56) References Cited

U.S. PATENT DOCUMENTS

2003/0214928 A1* 11/2003 Chuah ................ H04L 12/2602
370/336
2005/0270975 A1* 12/2005 Meylan .................. H04L 47/14
370/229
2008/0274747 A1* 11/2008 Ludwig ................... H04L 47/10
455/450

OTHER PUBLICATIONS

RAN2#56; Riga, Latvia; Title: Issues regarding Qos and UL scheduling (Tdoc R2-063160), Nov. 6-10, 2006.
3GPP TSG-RAN WG2 #59; Athens, Greece; Title: Dual Logical Channel (R2-073422), Aug. 20-24, 2007.
PCT International Search Report for International application No. PCT/SE2012/050705, Jun. 14, 2013.
PCT Written Opinion of the International Searching Authority for International application No. PCT/SE2012/050705, Jun. 13, 2013.

* cited by examiner

DEVICE AND METHOD FOR ACKNOWLEDGED MODE QOS

PRIORITY

This nonprovisional application is a U.S. National Stage Filing under 35 U.S.C. §371 of International Patent Application Serial No. PCT/SE2012/050705, filed Jun. 25, 2012 and entitled "Device and Method for Acknowledged Mode QoS."

TECHNICAL FIELD

The present invention discloses a controlling node and a method for use in a controlling node.

BACKGROUND

The notion of Quality of service, QoS, is used in cellular systems such as long term evolution, LTE, in order to assist one or more scheduling functions in the system to prioritize between users and services.

As specified in 3GPP (see for example specification 3GPP 23.203), QoS class indicators, QCIs, are used to classify different services in order to achieve the QoS concept. For example, QCI1 is specified as Conversational Voice and QCI2 is defined as Conversational Video (Live Streaming) in 3GPP 23.203. In LTE systems, in order to add the QoS concept to the LTE scheduling algorithm, priority has been introduced in order to prioritize between difference QCIs.

Following the QoS concept, a service with higher priority should be scheduled first, compared to a service with lower priority, and thus, in a scheduler, the priority will to a large extent be interpreted as a scheduling weight.

Users with a higher scheduling weight will be scheduled before user with lower weight. However, usually, a scheduler will not only consider the QCI priority, but also the channel quality or the accumulated delay of a packet to be scheduled, according to specific algorithms in the scheduler.

In general, according to the concept of QoS, the priority of QCIs gives a large impact on the scheduling "weight". Therefore, in a system which is highly "loaded" with high priority user equipments, UEs, a UE with low priority might not be able to be scheduled at all, and will thus run the risk of being "starved", due to the lower scheduling weight caused by the UE's low priority.

Different priorities between different UEs may also cause a problem related to the starvation, in cases where the so called Radio Link Control Acknowledged Mode, RLC AM, is used, as explained in the following:

Radio link control, RLC, protocol is one of the L2 protocols used in the LTE air interface, Uu, which connects an UE with "its" eNB. There are three transmission modes, TMs, used for RLC transmission protocol:

RLC transparent mode, TM,
RLC unacknowledged mode, UM,
RLC acknowledged mode, AM.

RLC AM transmissions from a transmitter relies on receiving RLC status reports, e.g. ACK/NACKs, from the intended receiver in order to see if a transmitted packet has been received successfully or not. Packets which are not received or which are received incompletely will be scheduled for retransmission later. However, if an RLC status report is not received after a certain period of timed, a retransmission of the packet will be scheduled automatically. After several retransmissions without received status reports, the RLC connection will be seen as a failure, and the UE is "dropped", as specified in 3GPP 36.322.

The traffic in downlink, DL, and uplink, UL, are not fully aligned with each other, i.e. there will be cases or situations in which there is a low traffic load in one direction, DL or UL, and a high traffic load in the other direction, UL or DL. In such cases, RLC AM traffic from low-priority UEs will be transmitted in the direction with the lower load, but the required corresponding RLC status report (ACK/NACKs) will be starved by higher priority UEs in the other direction, which will result in RLC failure, and the low priority UE will be dropped due to this. It can be mentioned here that the priority of a UE is the same for data and for the UE's RLC status reports, i.e. if the data traffic to/from a UE has low priority, the corresponding RLC status reports from/to the UE will have the same priority, which will lead to the possibility of a UE being dropped due to "starved" RLC status reports.

It can be added that the scheduling of traffic to ("downlink") and from ("uplink") the UEs in a cell is usually performed by a scheduler in the controlling node of the cell, the controlling node in LTE systems being referred to as the eNodeB or eNB.

SUMMARY

It is an object of the invention to obviate at least some of the drawbacks mentioned above of Radio Link Control Acknowledged Mode, RLC AM. This object is obtained by means of a method for use in a controlling node of a cell in a cellular system.

The method comprises the use of Radio Link Control Acknowledged Mode, RLC AM, and also comprises scheduling transmissions in the downlink and uplink directions to/from User Equipments, UEs, in the cell.

The scheduling comprises taking into account a priority which a UE has for its transmissions, and also comprises counting the number of scheduled transmissions for a UE in a first of said directions since its latest scheduled transmission in the other of said directions. If the count has reached a predetermined value, the priority of the UE in said other direction is increased, and when the UE has been scheduled for a transmission in said other direction, the counting in that direction is restarted from an initial value.

Thus, by means of the method, a connection is created between a UE's uplink and downlink transmissions, so that, for example, a UE with low priority which is scheduled for a number of data transmissions in, for example, the uplink direction will have its priority increased in the downlink direction. This will decrease the risk of the UE's status reports (e.g. ACK/NACK) in the downlink direction being "starved" by other UEs with higher priority, and naturally achieves the same effect in the "reverse" case, i.e. the case with data transmissions in DL and status reports in UL.

In one embodiment of the method, the increase in priority for a UE is such that its priority exceeds that of another UE with higher priority in the first direction.

In one embodiment of the invention, if there are more than two UEs with different priorities in the first direction, so that there are at least three different priority levels in that direction, the UE with the lowest priority, if it has its priority increased, receives an increase such that it exceeds the priority in the first direction of the UE with the second highest priority.

In one embodiment of the invention, if there are more than two UEs with different priorities in the first direction, so that there are at least three different priority levels in that direction, the UE with the lowest priority, if it has its priority increased, receives an increase such that its priority in the first direction is the highest of the three UEs.

The object of the invention is also obtained by means of a controlling node for a cell in a cellular system. The controlling node is arranged to use Radio Link Control Acknowledged Mode, RLC AM, and to schedule transmissions in the downlink and uplink directions to/from User Equipments, UEs, in the cell.

The controlling node is arranged to take into account in its scheduling a priority which a UE has for its transmissions, and the controlling node is further arranged to count the number of scheduled transmissions for a UE in a first of said directions since its latest scheduled transmission in the other of said directions. If the count reaches a predetermined value, the controlling node is arranged to increase the priority of the UE in said other direction, and when the UE has been scheduled for a transmission in said other direction, the controlling node is arranged to restart the counting in the first direction from an initial value.

In embodiments, the controlling node is arranged to increase the priority in the first direction for a UE such that the UE's priority exceeds that of another UE with higher priority in the first direction.

In embodiments, the controlling node is arranged to, if there are more than two UEs with different priorities in the first direction, so that there are at least three different priority levels in that direction and the controlling node increases the priority of the UE with the lowest priority, to let the increase be such that it exceeds the priority of the UE with the second highest priority.

In embodiments, the controlling node is arranged to, if there are more than two UEs with different priorities in the first direction, so that there are at least three different priority levels in that direction, and the controlling node increases the priority of the UE with the lowest priority, to let the increase be such that its priority in the first direction is the highest of the three UEs.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In order to facilitate the understanding of the invention, a brief description of a cellular system will first be given with reference to FIG. 1. The description will be given with the use of terminology from the Long Term Evolution cellular system, LTE, although it should be understood that this is merely by way of example, the invention can be used in a wide variety of cellular systems which use acknowledgement of transmissions, e.g. ACK/NACKs.

Figure 1:
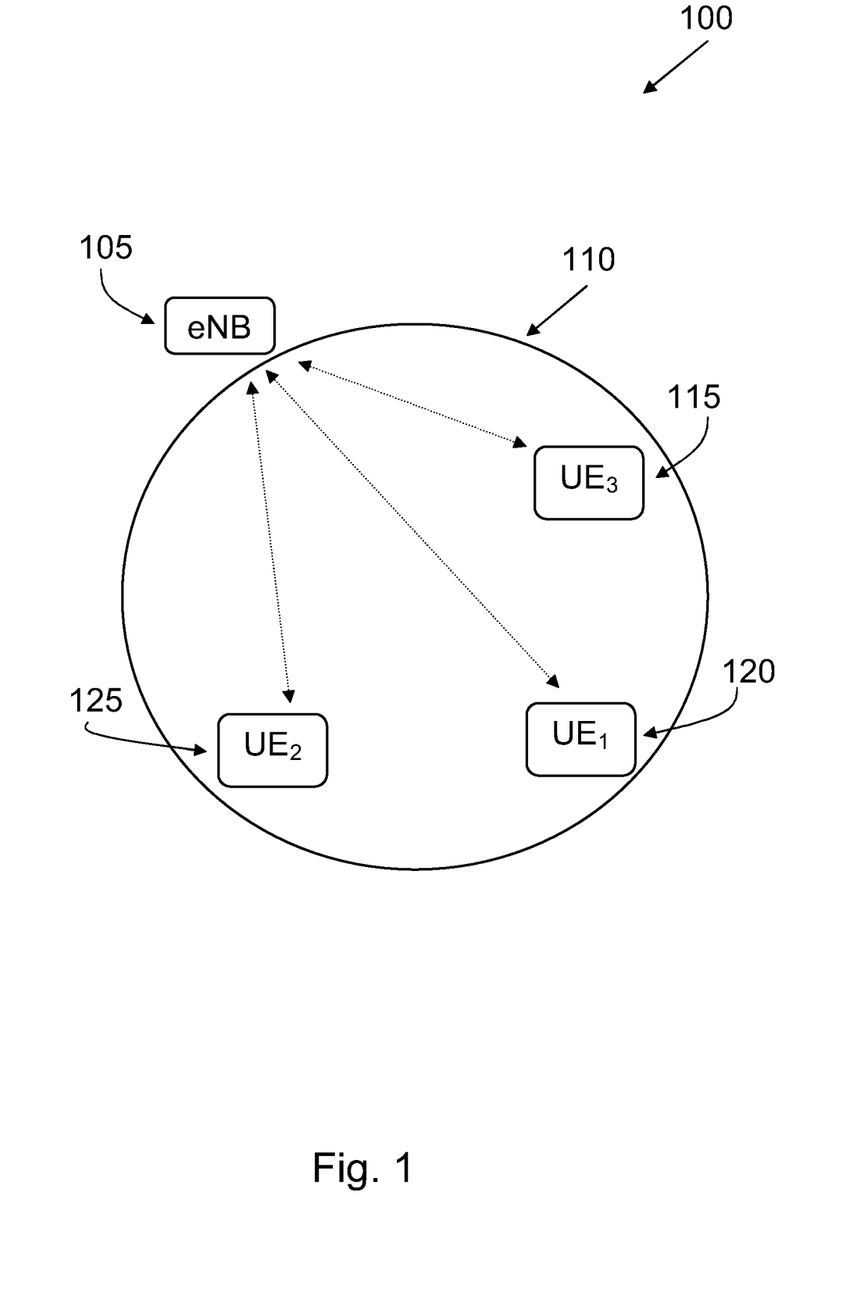
FIG. 1 shows an overview of a part of a cellular system.

Turning now to FIG. 1, we see a cell 110 from a cellular system 100. The cellular system 100 can comprise a large number of cells such as the one 110, and the cell 110 can in turn accommodate a number of User Equipments, UEs. In FIG. 1, three UEs, 115, 120 and 125 are shown. For each cell such as the one 110, there is a controlling node 105, in LTE known as the eNodeB or simply the eNB. All traffic to and from the UEs in a cell is routed via the cell's eNB. Traffic from the eNB to a UE is referred to as downlink traffic, DL, and traffic from a UE to its eNB is known as uplink traffic, UL. The UL and DL traffic in a cell is scheduled by a scheduling function in the eNB of the cell.

Traffic to or from different UEs can have different priorities. In addition, in so called Radio Link Control Acknowledged Mode, DL/UL traffic to/from a UE is acknowledged by means of a status report, a so called ACK/NACK. The ACK/NACK for a transmission which was sent to a UE in one direction gets the same priority as the original packet or transmission itself had in the direction in which it was sent, which, as explained previously, can lead to starvation and ultimately the "dropping" of a UE, especially if there is heavy and highly prioritized traffic in the direction in which the ACK/NACK is to be sent and the UE in question has a relatively low priority in "the traffic direction".

Thus, as can be seen, there is no "linkage" between the number of transmissions a UE is scheduled for in the two directions, DL and UL. This lack of linkage, and thus the accompanying problem of "starvation" which was described initially in this text is alleviated by means of a method 200 which will be described below with reference to a flow chart which is shown in FIG. 2.

As has emerged from the description above, the method 200 is for use in a controlling node of a cell in a cellular system, and comprises, as is shown in step 205, the use of Radio Link Control Acknowledged Mode, RLC AM.

As shown in step 210, the method 200 also comprises scheduling transmissions in the downlink, DL, and uplink, UL, to/from User Equipments, UEs, in the cell, taking into account a priority which a UE has for its transmissions.

Figure 2:
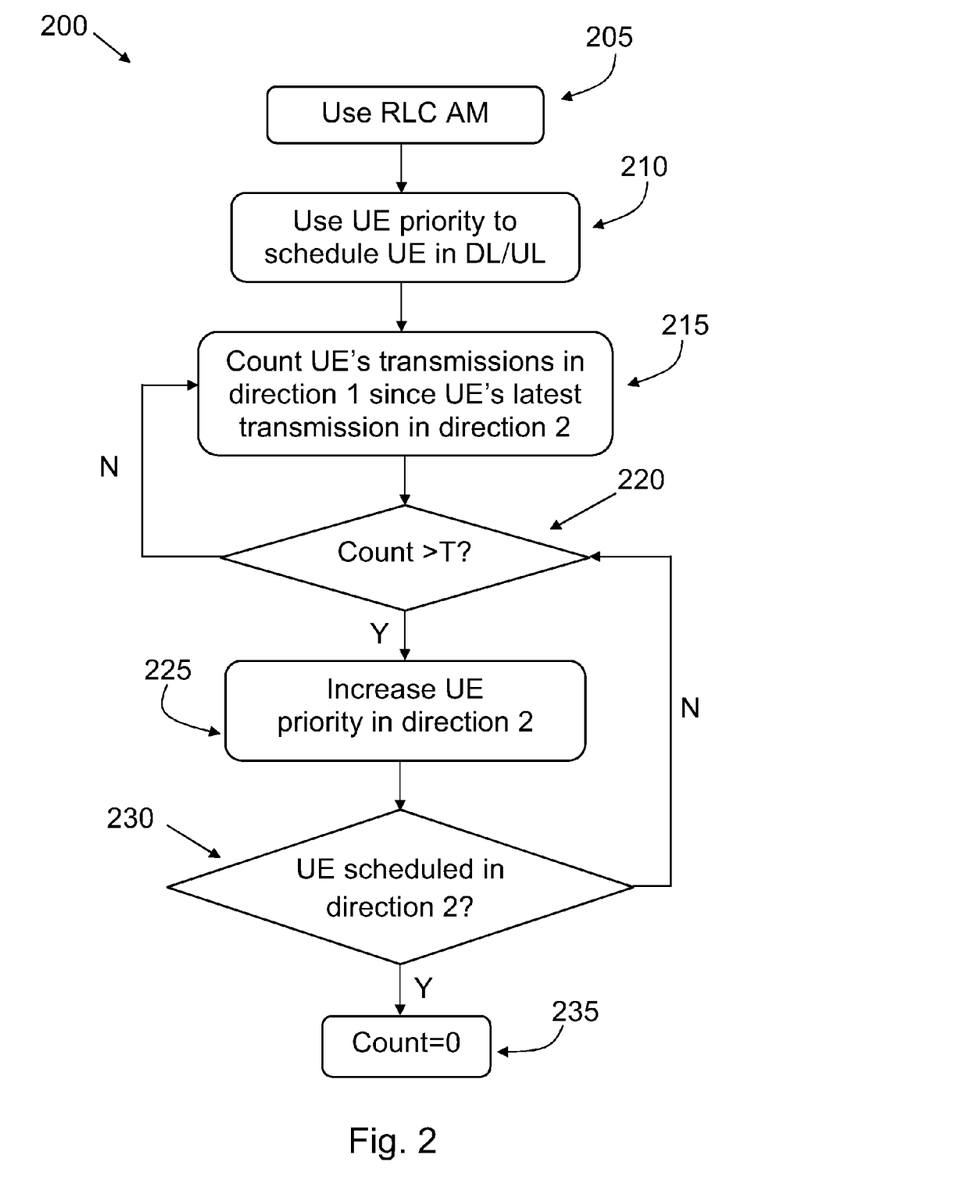
FIG. 2 shows a flowchart of a method.

As indicated in step 215, the method also comprises counting the number of scheduled transmissions for a UE in a first of said directions ("direction 1" in FIG. 2) since the UE's latest scheduled transmission in the other of said directions ("direction 2" in FIG. 2). It should be pointed out that the "first direction" and "second direction" can be either combination of UL and DL.

As shown in step 220, if the count of step 215 has reached a value which exceeds a predetermined value "T", then, as shown in step 225, the priority of the UE is increased in the second direction, while, if the count has not reached a value which exceeds the value "T", the method is restarted from step 215.

When "T" has been reached, then, as shown in step 230, when the UE has been scheduled for a transmission in said second direction, the counting in that direction is restarted from an initial value, e.g. 0, as shown in step 235. It should be pointed out that the criterion of step 230 applies whenever the UE has been scheduled in that direction, regardless of whether or not that scheduling was brought about by means of the count reaching the value "T", or for some other reason.

In step 230, if the UE has not been scheduled for a transmission in said second direction, the method "restarts" from step 220.

In embodiments of the method 200, the increase in priority for a UE, shown in step 225, is such that the UE's priority exceeds that of another UE with higher priority in the second direction.

In embodiments of the method 200, if there are more than two UEs with different priorities in the first direction, so that there are at least three different priority levels in that direction, and the UE with the lowest priority has its priority increased, the increase is such that it exceeds the priority of the UE with the second highest priority.

In embodiments of the method 200, if there are more than two UEs with different priorities in the first direction, so that there are at least three different priority levels in that direction, and the UE with the lowest priority has its priority increased, the priority is increased so that the UE's priority in the first direction is the highest of the three UEs.

The invention will now be described further with reference to FIG. 3, which shows a timeline of events for an UE indicated as UE2, which is shown with a column with checkered pattern in FIG. 3. UE2 is a low priority UE, i.e. it has a low QoS, which causes it to have a low priority.

Figure 3:
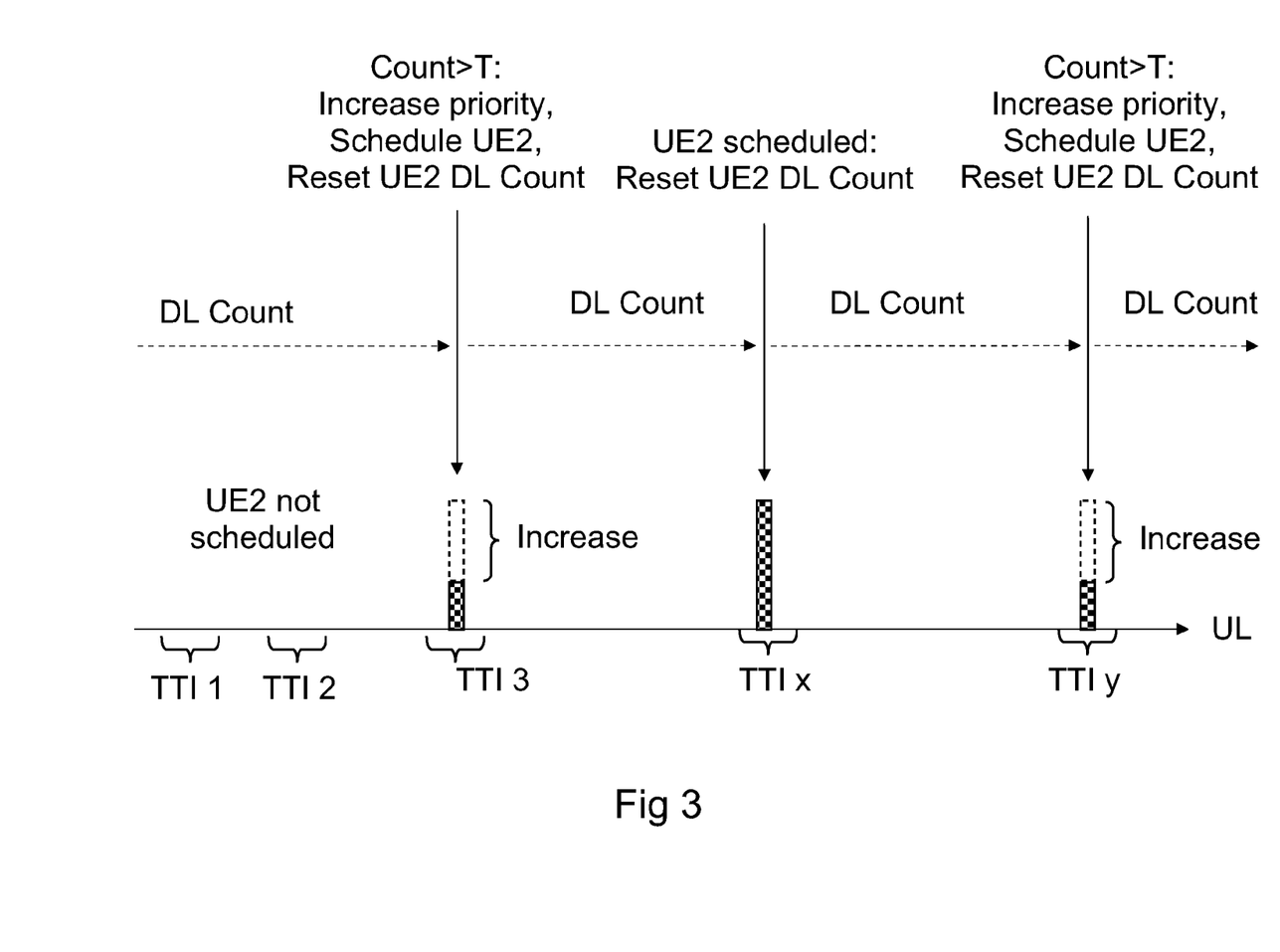
FIGS. 3-5 show a principle used in the invention, and, FIG. 6 shows a controlling node of the invention.

The axis labeled "UL" in FIG. 3 shows the UL scheduling for UE2 over a number of Transmission Time Intervals, TTIs, ranging from TTIs 1 to 3, and then to TTIs x and y, where x and y are integers. It should be emphasized that TTIs x and y do not necessarily have to be consecutive TTIs, i.e. there can be a number of TTIs between TTI 3 and TTI x, as well as between TTI x and TTI y.

During TTIs 1 and 2, UE2 is not scheduled for any UL transmissions, due to its low priority. As shown by means of an arrow labeled "DL count", a count is kept of the number of DL transmissions which UE2 is scheduled for. If the DL count of UE2 exceeds a threshold T, UE2 receives an increase in its UL priority, which increases the likelihood of it being scheduled for an UL transmission, which is what happens at TTI 3: here, UE2's DL count exceeds the threshold T, and thus the UL priority of UE2 is increased, which leads to the UE 2 being scheduled in UL at TTI 3. Since UE 2 has now been scheduled for an UL transmission, the DL count for UE2 is reset, preferably to zero, although other values are also possible. It should also be pointed out that the increase in UL priority which UE2 receives after TTIs 1 and 2 does not necessarily need to lead to an UL transmission in the next TTI, i.e. TTI 3, it merely increases the likelihood, but the actual scheduling depends on how many other UEs need to be scheduled in the same TTI and their priorities as compared to the (increased) priority of UE2.

Although UE2 can be scheduled for UL transmissions due to the increased priority it gets when the DL count exceeds the threshold T, UE2 can also be scheduled for UL transmissions for a variety of other reasons, such as the absence of UL data for transmission from other higher priority UEs, which is what happens at TTI x: here, UE2 is scheduled for an UL transmission without its DL count having exceeded the threshold T, but the DL count for UE2 is still reset to the initial value, due to the UE2 UL transmission.

At TTI y, the same thing which happened at TTI 3 happens: here, again, UE2's DL count exceeds the threshold T, and thus the UL priority of UE2 is increased, which leads to the UE 2 being scheduled in UL at TTI y. Since UE 2 has now been scheduled for an UL transmission, the DL count for UE2 is reset, preferably to zero, although other values are also possible.

Figure 4:
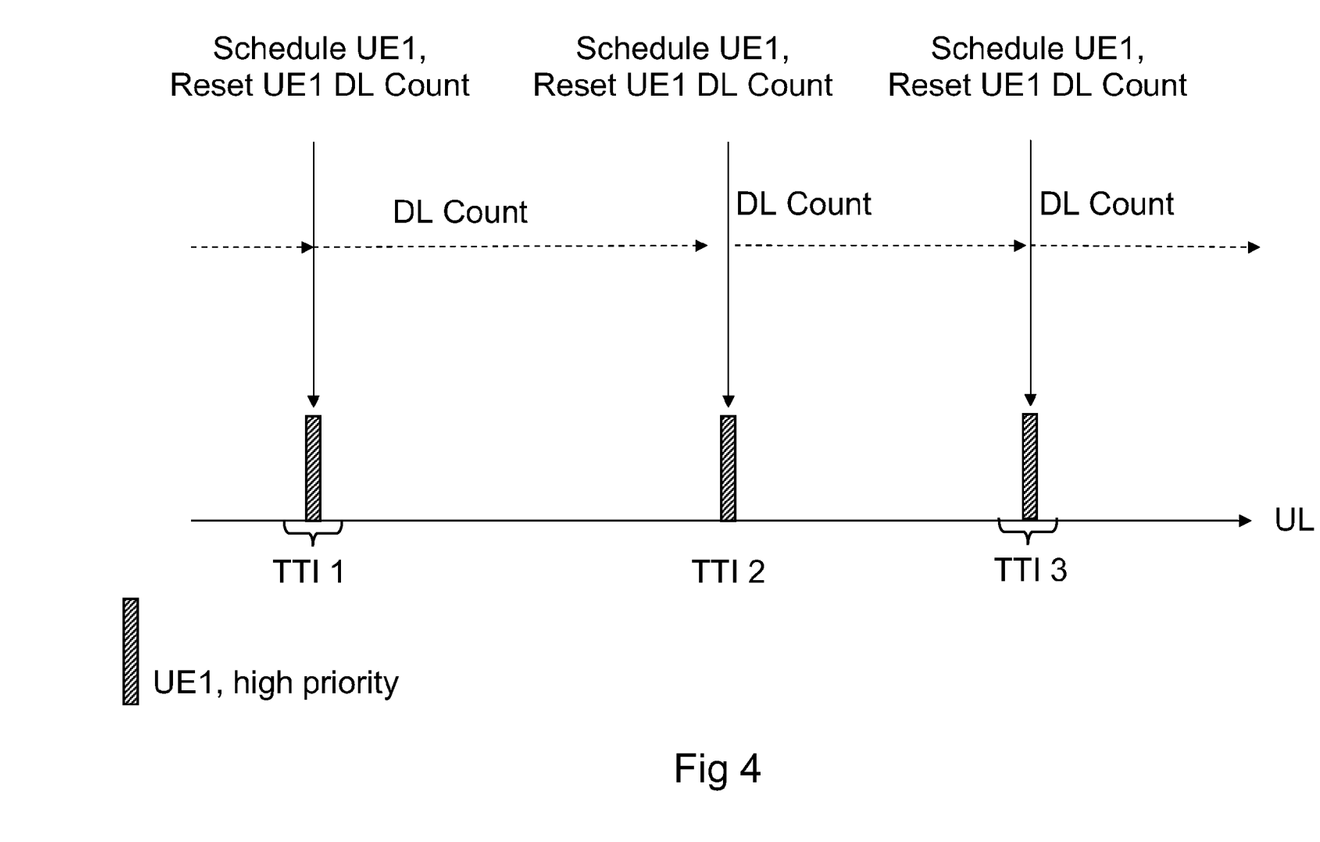

Looking now at a similar timeline of events for an UE with a higher priority than UE2, we turn to FIG. 4, where we see a high priority UE labeled as UE 1 and shown with a striped column, this column being higher than the column for UE2, indicating the differences in the QoS and accompanying priority for the two UEs UE1 and UE 2. For UE1 as well as for UE 2, a DL count is kept, i.e. a count of the number of DL transmissions for which UE 1 is scheduled. Due to the higher priority of UE 1, UE 1 is scheduled for DL transmissions at TTIs 1-3, which leads to the DL count for UE1 being reset at each of TTIS 1-3. Since this shows the effect of a high priority UE, TTIs x and y are not shown in FIG. 4.

As mentioned, one of the benefits of the invention is that it addresses the situation where a "low priority" UE, such as the UE2, may be "starved" when wishing to send ACK/NACKs in one direction, due to the presence of higher priority UEs, such as the UE1, whose scheduling in the direction in which UE2 needs to send ACK/NACK will be given priority over UE2, so that UE2s ACK/NACKs are not scheduled, which eventually may lead to UE2s connection being terminated or dropped in the system.

Figure 5:
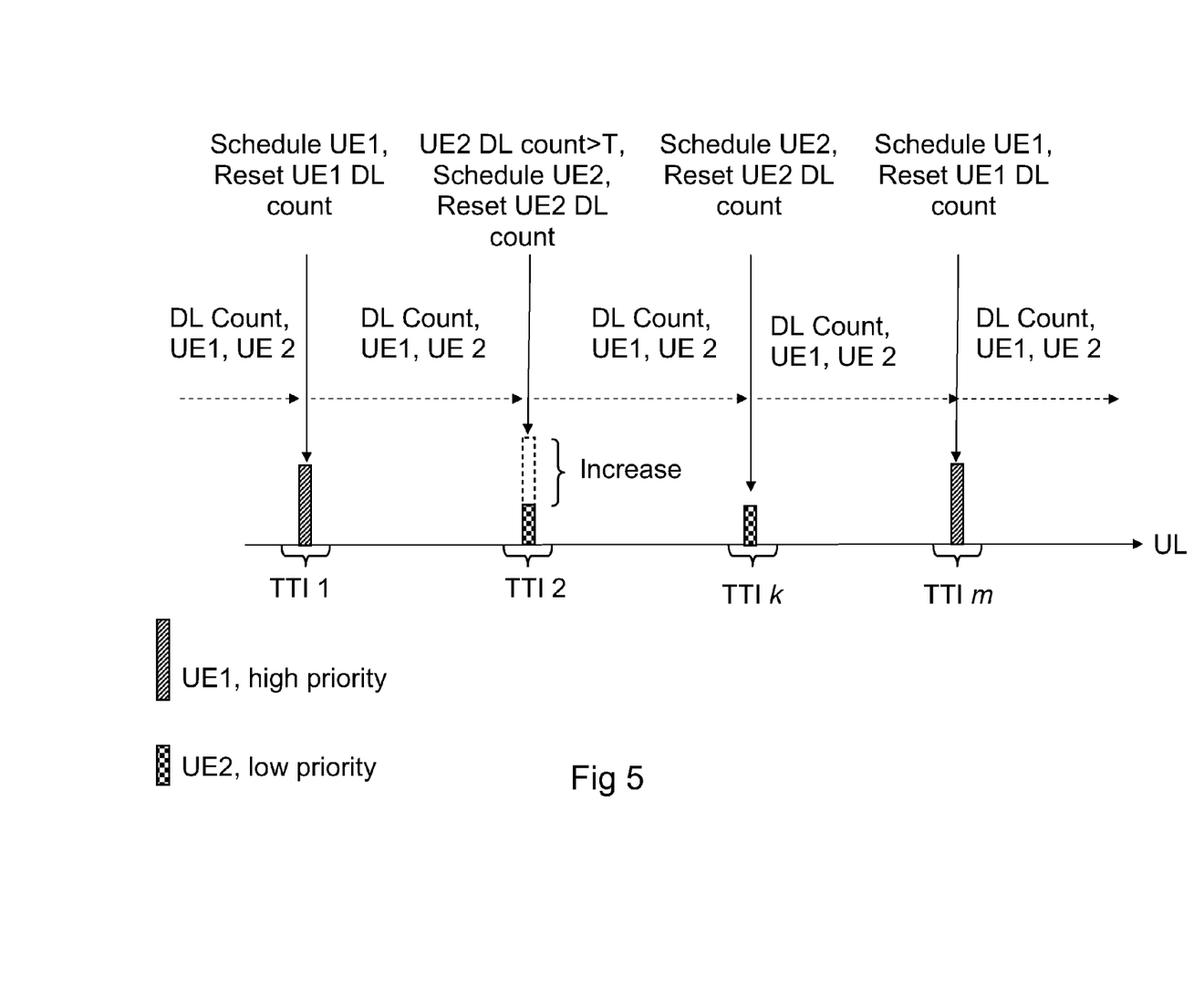

FIG. 5 shows a sequence of events involving both UE1 and UE2 over a number of TTIs, numbered as 1, 2, k and m, where k and m are integers; however, TTIs k and m are not necessarily consecutive TTIs. As indicated in FIG. 5, for both UE1 and 2, a count is kept of the number of DL transmissions for which UE1 and 2 are scheduled. As has also been mentioned previously, the height of the columns for UEs 1 and 2 indicate their respective priorities, so that UE1 has a higher priority than UE2.

At TTI 1, UE 1 is scheduled for an UL transmission, due to its higher priority. Due to this, the UE1 DL count is reset to an original value, preferably zero. It should be mentioned that although zero is a preferable value for the initial values of the DL count for both UE1 and UE 2, other values may also be used, and the initial values used for UE1 and 2 may also differ from each other.

At TTI 2, the DL count for UE2 has reached a value which exceeds the threshold value T, so the priority for UE2 is increased ("boosted"), which leads to UE2 being scheduled at TTI 2. Hence, UE2's DL count is reset to the initial value, i.e. restarted from the initial value. Here we see one virtue of the invention: without the invention, UE1 would have been scheduled at TTI 2, but now UE2 is scheduled instead, and thus gets a chance to transmit an ACK/NACK, e.g. in response to the transmission which caused the UE2 DL count to increase.

After TTI 2, the DL count for UE1 and UE2 is continued, and at TTI k, UE2 is scheduled for UL transmission for a reason not connected to the priority increase given by the invention. Regardless, UE2's DL count is reset.

At TTI 5, UE 1 is again scheduled for an UL transmission, due to its higher priority. Due to this, the UE1 DL count is reset to the initial value.

It should be pointed out that although FIGS. 3-5 show UL scheduling and DL count for the UEs, the same procedure is suitably simultaneously carried out in the opposite direction, i.e. DL scheduling, UL count, and comparison of the UL count with a threshold value T, which may or may not be the same as the DL value T.

In addition to the method described above, there is also disclosed a controlling node 105 for a cell in a cellular system. The controlling node 105 is arranged to use Radio Link Control Acknowledged Mode, RLC AM, and to schedule transmissions in the downlink and uplink directions to/from User Equipments, UEs, in the cell.

The controlling node 105 is arranged to take into account in its scheduling a priority which a UE has for its transmissions, and the controlling node 105 is further arranged to count the number of scheduled transmissions for a UE in a first of said directions since its latest scheduled transmission in the other of said directions, and if the count reaches a predetermined value, to increase the priority of the UE in said other direction, and when the UE has been scheduled for a transmission in said other direction, restart the counting in the first direction from an initial value.

In embodiments, the controlling node is arranged to increase the priority in the first direction for a UE such that the UE's priority exceeds that of another UE with higher priority in the first direction.

In embodiments, the controlling node is arranged to, if there are more than two UEs with different priorities in the first direction, so that there are at least three different priority levels in that direction and the controlling node increases the priority of the UE with the lowest priority, to let the increase be such that it exceeds the priority of the UE with the second highest priority.

In embodiments, the controlling node is arranged to, if there are more than two UEs with different priorities in the first direction, so that there are at least three different priority levels in that direction, and the controlling node increases the priority of the UE with the lowest priority, to let the increase be such that its priority in the first direction is the highest of the three UEs.

Figure 6:
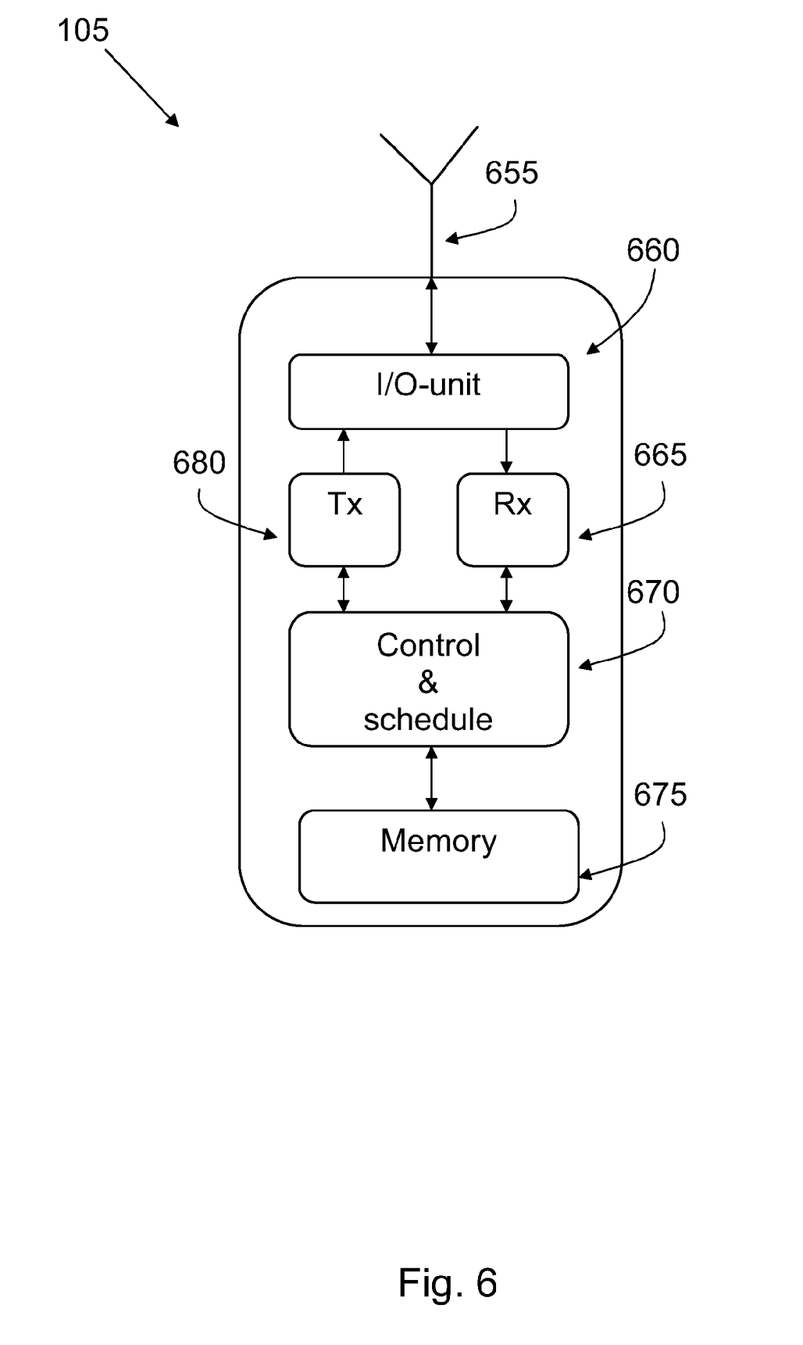

FIG. 6 shows a schematic block diagram of a controlling node 105. The controlling node 105 comprises an antenna unit 655, which is used for transmissions to and from the UEs in the cell or cells which the controlling node controls. In addition, the controlling node 105 also comprises an I/O unit 660 which is connected to the antenna unit 655 for processing transmissions to/from the controlling node 105.

In addition, the I/O-unit 660 also serves as an interface unit towards nodes in the system to which the controlling node 105 is connected via other means than the antenna unit 655, e.g. connections via "landlines".

As shown in FIG. 6, the controlling node comprises a transmit unit, Tx 680, which serves to, for example, in the case of transmissions via the antenna unit 655, modulate information and convert them to the proper transmission frequency. Similarly, the controlling node 105 also comprises a receive unit, Rx 665, which serves to, for example, in the case of transmissions via the antenna unit 655, demodulate information and convert them to lower frequencies or to baseband frequency.

In addition, there is also a control unit 670 arranged to control all or the main functions of the controlling node 105. Suitably, the controlling unit 670 is the unit in the controlling node 105 in which the DL/UL count described above is performed, as an alternative to which it can be carried out in a separate (not shown) counting unit. It is also the control unit, as shown in FIG. 6, which performs the UL/DL scheduling of the UEs in the cell or cells controlled by the control unit 105, as an alternative to which it can be carried out in a separate (not shown) scheduling unit. The comparison between the value of the UL/DL count described above and the threshold value T is also suitably performed in the control unit 670.

In addition, the controlling node 105 also comprises a memory unit 675, connected to the control unit 670. The memory unit 675 can serve to, for example, be the unit in which the UE priorities and the value of the count described above are maintained.

Embodiments of the invention are described with reference to the drawings, such as block diagrams and/or flowcharts. In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A method for use in a controlling node of a cell in a cellular system, the method comprising a use of Radio Link Control Acknowledged Mode, RLC AM, the method also comprising scheduling transmissions in downlink and uplink directions to/from User Equipments, UEs, in the cell, said scheduling comprising taking into account a priority which a UE has for its downlink and uplink transmissions, the method also comprising counting a number of scheduled transmissions for the UE in a first of said downlink and uplink direction to/from the UE since its latest scheduled transmission in other of said downlink and uplink direction to/from the UE, and if the count of the number of scheduled transmissions for the UE in the first of said downlink and uplink direction to/from the UE has reached a predetermined value, increasing the priority of the UE in the other of said downlink and uplink direction to/from the UE, and when the UE has been scheduled for a transmission in the other of said downlink and uplink direction to/from the UE, restarting the counting in the first of said downlink and uplink direction to/from the UE from an initial value.

2. The method of claim 1, according to which the increase in the priority for the UE is such that its priority exceeds that of another UE with higher priority in the first of said downlink and uplink direction.

3. The method of claim 1, according to which, if there are more than two UEs with different priorities in the first of said downlink and uplink direction, so that there are at least three different priority levels in that direction, a UE with the lowest priority, if it has its priority increased, the increase is such that it exceeds a priority of a UE with the second highest priority.

4. The method of claim 1, according to which, if there are more than two UEs with different priorities in the first of said downlink and uplink direction, so that there are at least three different priority levels in that direction, a UE with the lowest priority, if it has its priority increased, has its priority increased so that its priority in the first of said downlink and uplink direction is the highest of the UEs.

5. A controlling node for a cell in a cellular system, the controlling node comprising of a control unit being arranged to use Radio Link Control Acknowledged Mode, RLC AM, and to schedule transmissions in downlink and uplink directions to/from User Equipments, UEs, in the cell, the controlling node being arranged to take into account in said scheduling a priority which a UE has for its downlink and uplink transmissions, the controlling node further being arranged to count a number of scheduled transmissions for the UE in a first of said downlink and uplink direction to/from the UE since its latest scheduled transmission in other of said downlink and uplink direction to/from the UE, and if the count of the number of scheduled transmissions for the UE in the first of said downlink and uplink direction to/from the UE reaches a predetermined value, to increase the priority of the UE in the other of said downlink and uplink direction to/from the UE, and when the UE has been scheduled for a transmission in the other of said downlink and uplink direction to/from the UE, to restart the counting in the first of said downlink and uplink direction to/from the UE from an initial value.

6. The controlling node of claim 5, being arranged to increase the priority in the first of said downlink and uplink direction for the UE such that the UE's priority exceeds that of another UE with higher priority in the first of said downlink and uplink direction.

7. The controlling node of claim 5, being arranged to, if there are more than two UEs with different priorities in the first of said downlink and uplink direction, so that there are at least three different priority levels in that direction and the controlling node increases a priority of a UE with the lowest priority, to let the increase be such that it exceeds a priority of a UE with the second highest priority.

8. The controlling node of claim 5, being arranged to, if there are more than two UEs with different priorities in the first of said downlink and uplink direction, so that there are at least three different priority levels in that direction, and the controlling node increases a priority of a UE with the lowest priority, to let the increase be such that its priority in the first of said downlink and uplink direction is the highest of the UEs.

\* \* \* \* \*